United States Patent [19]

Jolivet et al.

[11] 4,055,756

[45] Oct. 25, 1977

[54] IMAGE CODER-DECODER USING A MATRIX TRANSFORM WITH WEIGHTED CONTRIBUTION OF SEVERAL POINTS OF THE IMAGE TO THE FORMATION OF ONE POINT OF THE TRANSFORM

[75] Inventors: Jean-Claude Jolivet, St. Michel en Greve; François-Xavier Antoine Stouls, Perros Guirec, both of France

[73] Assignee: Societe Anonyme de Telecommunications, Paris, France

[21] Appl. No.: 728,189

[22] Filed: Sept. 30, 1976

[30] Foreign Application Priority Data

Oct. 24, 1975 France ................... 75.3262

[51] Int. Cl.$^2$ .......................... G06F 15/34
[52] U.S. Cl. ...................... 364/725; 364/727
[58] Field of Search ............ 235/156, 152, 164

[56] References Cited

U.S. PATENT DOCUMENTS

| 3,952,186 | 4/1976 | Speiser et al. ............... 235/156 |
| 3,981,443 | 9/1976 | Lynch et al. ............... 235/156 |

OTHER PUBLICATIONS

W. K. Pratt et al., "Hadamard Transform Image Coding", *Proceeding of the IEEE*, vol. 57, No. 1. Jan. 1969, pp. 58-68.
K. R. Rao et al., "Image Data Processing by Hadamard - Haar Transform", *IEEE Trans. on Computers*, vol. C-24, No. 9, Sept. 1975, pp. 888-896.

*Primary Examiner*—David H. Malzahn

[57] ABSTRACT

A matrix transform system for coding and decoding images. The system comprises means for sampling the lines and the columns of an image and forming with these samples a sample square matrix and storing the same. This sample square matrix is split into component square matrices of order 3N × 3N having a central part of order N × N. Each of these component matrices is multiplied by a first rectangular coefficient matrix of order N × 3N having a square central part in which the coefficients are equal to unity and two square lateral parts in which the coefficients are selectively equal to zero and a predetermined factor smaller than unity, which gives an intermediate matrix of order N × 3N. This intermediate matrix is multiplied by a second rectangular coefficient matrix of order 3N × N which is the transpose of the first rectangular coefficient matrix, which gives an output matrix of order N × N which is the transform of the central part of the component matrix. If N = 2, the output matrix is of order 2 × 2; one of its terms depends on four samples of the image, two of its terms depend on 12 samples of the image and the last of its terms depends on 36 samples of the image.

5 Claims, 10 Drawing Figures

|   |   |    |    |   |   |
|---|---|----|----|---|---|
| o | o | o  | o  | o | o |
| o | o | o  | o  | o | o |
| o | o | 1  | 1  | o | o |
| o | o | 1  | 1  | o | o |
| o | o | o  | o  | o | o |
| o | o | o  | o  | o | o |

B

|   |   |   |   |   |   |
|---|---|---|---|---|---|
| o | o | o | o | o | o |
| o | o | o | o | o | o |
| $-\alpha$ | $-\alpha$ | 1 | $-1$ | $\alpha$ | $\alpha$ |
| $-\alpha$ | $-\alpha$ | 1 | $-1$ | $\alpha$ | $\alpha$ |
| o | o | o | o | o | o |
| o | o | o | o | o | o |

C

|   |   |    |    |   |   |
|---|---|----|----|---|---|
| o | o | $-\alpha$ | $-\alpha$ | o | o |
| o | o | $-\alpha$ | $-\alpha$ | o | o |
| o | o | 1  | 1  | o | o |
| o | o | $-1$ | $-1$ | o | o |
| o | o | $\alpha$ | $\alpha$ | o | o |
| o | o | $\alpha$ | $\alpha$ | o | o |

D

| $\alpha^2$ | $\alpha^2$ | $-\alpha$ | $\alpha$ | $-\alpha^2$ | $-\alpha^2$ |
|---|---|---|---|---|---|
| $\alpha^2$ | $\alpha^2$ | $-\alpha$ | $\alpha$ | $-\alpha^2$ | $-\alpha^2$ |
| $-\alpha$ | $-\alpha$ | 1 | $-1$ | $\alpha$ | $\alpha$ |
| $\alpha$ | $\alpha$ | $-1$ | 1 | $-\alpha$ | $-\alpha$ |
| $-\alpha^2$ | $-\alpha^2$ | $\alpha$ | $-\alpha$ | $\alpha^2$ | $\alpha^2$ |
| $-\alpha^2$ | $-\alpha^2$ | $\alpha$ | $-\alpha$ | $\alpha^2$ | $\alpha^2$ |

$U_{i+2,j+2}$, $U_{i+2,j+3}$, $U_{i+3,j+2}$, $U_{i+3,j+3}$

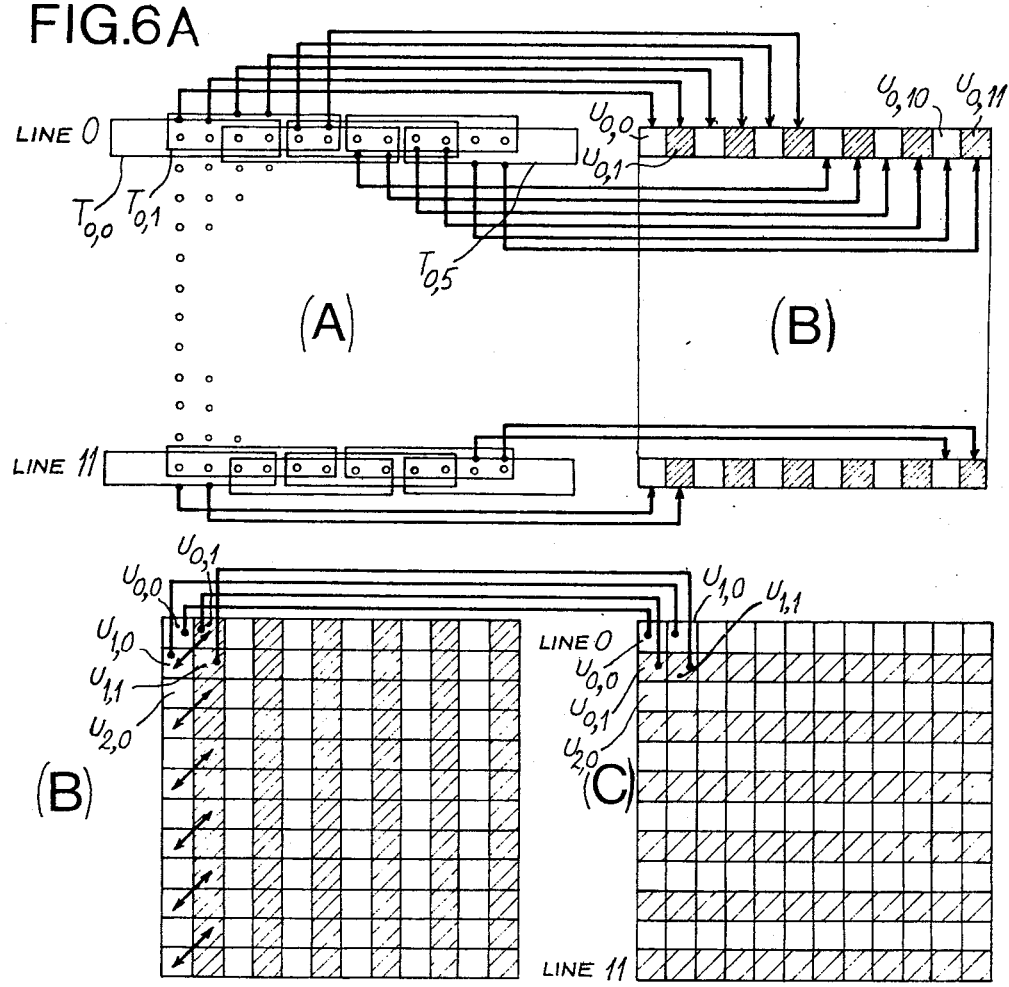

FIG.6B
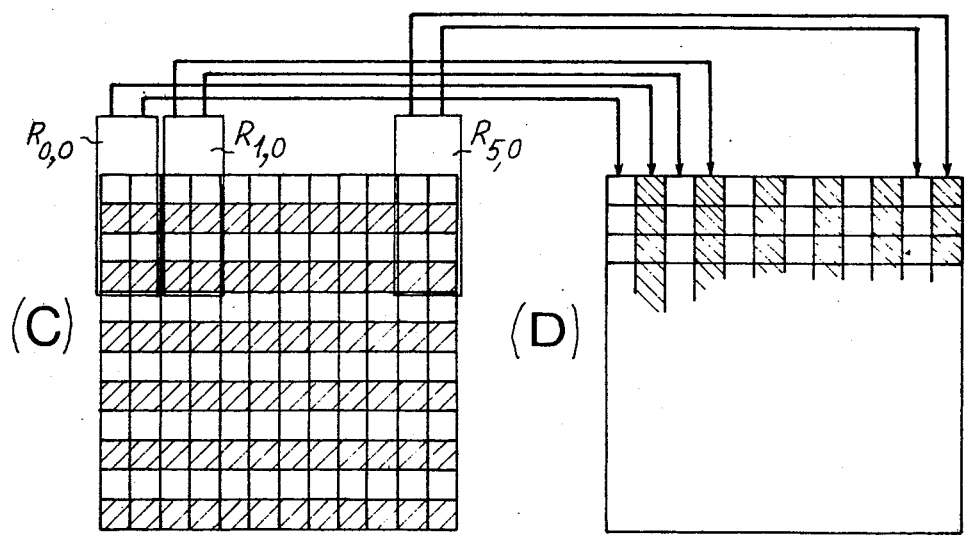
Processing of the 1st line of the C matrix (only the white squares of C are processed)
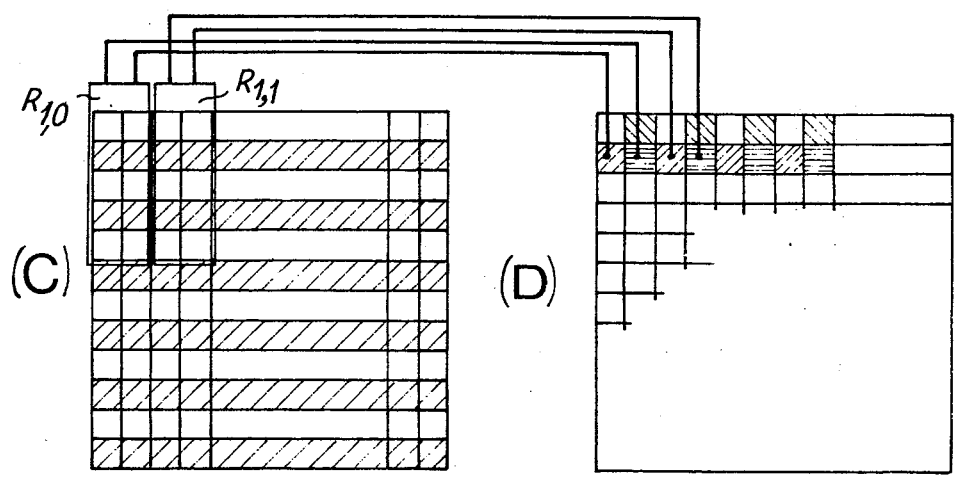
Processing of the 2nd line of the C matrix (only the hatched squares are processed)

IMAGE CODER-DECODER USING A MATRIX TRANSFORM WITH WEIGHTED CONTRIBUTION OF SEVERAL POINTS OF THE IMAGE TO THE FORMATION OF ONE POINT OF THE TRANSFORM

BACKGROUND OF THE INVENTION

The present invention relates to a system for coding and decoding images using a matrix transform, the said system allowing a compression of the image signals.

PRIOR ART

It is known to make a transform $F(u,v)$ correspond to a bidimentional image function $f(x,y)$ having $N^2$ points, the transform $F(u,v)$ being defined by the matrix product:

$$[F(u,v)] = [H(u,v)] \cdot [f(x,y)] \cdot [H(u,v)]^T \qquad (1)$$

an equation in which $H$ is a transform matrix of order $N \times N$, and $[H]^T$ is the corresponding transposed matrix. This matrix can, for example, be a Hadamard or a Haar matrix. In the case [H] is a Hadamard matrix, the following references may be referred to: (i) "Utilisation de la transformée de Hadamard pour le codage et la compression des signaux d'images" by Jacques Poncin, "Annales des Télécommunications" Volume 26, No. 7-8, 1971; (ii) "Hadamard Transform Image Coding" by William K. PRATT, Julius KANE and Harry C. ANDREWS, Proceedings if the IEEE, Vol. 57, No. 1 January 1969; (iii) "Intraframe Image Coding by Cascaded Hadamard Transforms" by Takahiko FUNINIKI and Masachika MIYATA, IEEE Transactions on Communications, Vol. Com. 21, No. 3, March 1973. In the case where [H] is a Haar matrix, the following reference can be referred to: "A Generalized Technique for Spectral Analysis" by Harry C. ANDREWS and Kenneth L. CASPARI, IEEE Transactions on Computers, Vol. C-19, No. 1, January 1970, pages 16–25.

If the matrix [H] is orthogonal and orthonormal, the product $[H]^T \times [H]$ is equal to N times the unit matrix. It is the same for the Hadamard and Haar matrices and, in this case, the inverse transform:

$$[f(x,y)] = \frac{1}{N^2} [H(u,v)]^T \cdot [F(u,v)] \cdot [H(u,v)] \qquad (2)$$

uses the same transform matrix [H] as the direct transform.

Since the Hadamard matrices are square matrices of order $N \times N = 2^n \times 2^n$, it is possible to treat by transformation, either the complete image, or successively small component sub-images. In fact, in order to restrict the circuitry in the case of high definition images and, notably, the capacity of the random access memory containing the image samples and the read only memory containing the coefficients of the Hadamard matrix, the transformation is generally applied to partial images having $N^2$ points, the total number of image points being $N'^2$.

Thus, these transformations make a transform of $N^2$ coefficients correspond to a partial image of $N \times N$ points, the said coefficients only taking into account the $N^2$ points of origin. In this way if, during the inverse transformation, the image is reconstructed by only taking into account certain coefficients, a structure with false step-like contours appears. In particular, if a sub-image is reconstructed by inverse transformation from a single element representing the average luminance of the sub-image, the overall image is formed by a juxtaposition of squares whose repetitive structure can mask the content of the image itself.

SUMMARY OF THE INVENTION

The object of the present invention is a system for coding and decoding images by means of a transformation consisting of a sequence of matrix multiplications operating on partial images, allowing the alleviation to a great extent of the above described faults of the images obtained by Hadamard direct transformation and Hadamard inverse transformation, and allowing a better compression of the rate in bits per second necessary for the transmission of the total image.

The transformation used in the present invention will be explained by comparing it with a classic Hadamard transformation.

In the case of a unidimensional transformation, a certain number of successive samples of a line of the sample matrix are considered, for example the six samples $x_{i,j}$ to $x_{i,j+5}$. The two central samples $x_{i,j+2}$ $x_{i,j+3}$ are the two samples to be transformed, the four other samples, two on the left $x_{i,j}$ and $x_{i,j+1}$ and two on the right $x_{i,j+4}$ and $x_{i,j+5}$ are samples acting on the transformation. These six samples form a rectangular matrix of order $1 \times 6$.

The multiplication matrix is a rectangular matrix of order $6 \times 2$ for which the central part is a Hadamard matrix of order 2. It follows that the product of the multiplication is a matrix of order $1 \times 2$. The matrix equation of the transformation is the following:

$$[x_{i,j} \, x_{i,j+1} \, \boxed{x_{i,j+2} \, x_{i,j+3}} \, x_{i,j+4} \, x_{i,j+5}] \times \begin{bmatrix} 0 & -\alpha \\ 0 & -\alpha \\ 1 & 1 \\ 1 & -1 \\ 0 & \alpha \\ 0 & \alpha \end{bmatrix} = [u_{i,j+2} \, u_{i,j+3}] \qquad (3)$$

this gives for the coefficients $u$ obtained by matrix multiplication:

$$u_{i,j+2} = x_{i,j+2} + x_{i,j+3} \qquad (4)$$

$$u_{i,j+3} = -\alpha x_{i,j} - \alpha x_{i,j+1} + x_{i,j+2} - x_{i,j+3} + \alpha x_{i,j+4} + \alpha x_{i,j+5} \qquad (5)$$

where $\alpha$ designates a constant less than one. The coefficient $u_{i,j+2}$ is the average value of the luminances of the two points $x_{i,j+2}$ and $x_{i,j+3}$. As for the coefficient $u_{i,j+3}$ it can also be written:

$$u_{i,j+3} = -\alpha \, u_{i,j} + x_{i,j+2} - x_{i,j+3} + \alpha \, u_{i,j+4} \qquad (5')$$

In the formula (3), the parts which would have alone been present with a Hadamard transformation of order two have been surrounded in the sample matrix of order $1 \times 6$ and the multiplication coefficient matrix of order $6 \times 2$ of the first member.

The inverse transformationn allowing the reconstruction of $x_{i,j+2}$ and the $x_{i,j+3}$ takes into account not only the coefficients $u_{i,j+2}$ and the $u_{i,j+3}$, but also transformed coefficients of adjacent sub-assemblies $u_{i,j}$, $u_{i,j+1}$ and $u_{i,j+4}$ $u_{i,j+5}$.

$$[x_{i,j+2}\ x_{i,j+3}] = \frac{1}{2} [u_{i,j}\ u_{i,j+1}\ \boxed{u_{i,j+2}\ u_{i,j+3}}\ u_{i,j+4}\ u_{i,j+5}] \begin{bmatrix} \alpha & \alpha \\ 0 & 0 \\ 1 & 1 \\ 1 & -1 \\ -\alpha & \alpha \\ 0 & 0 \end{bmatrix} \quad (6)$$

which gives:

$$2x_{i,j+2} = \alpha u_{i,j} + u_{i,j+2} + u_{i,j+3} - \alpha u_{i,j+4} \quad (7)$$

$$2x_{i,j+3} = -\alpha u_{i,j} + u_{i,j+2} - u_{i,j+3} + \alpha u_{i,j+4} \quad (8)$$

By putting :

$$w_{i,j+2} = \alpha u_{i,j} + u_{i,j+3} - \alpha u_{i,j+4}$$

the formula (7) and (8) can be written:

$$2x_{i,j+2} = u_{i,j+2} + w_{i,j+2} \quad (7')$$

$$2x_{i,j+3} = u_{i,j+2} - w_{i,j+2} \quad (8')$$

It can be seen that the two consecutive samples of the transform are formed from six samples of the original image and that two consecutive samples of the reconstructed image are formed from six samples of the transform. In the formula (6), the parts which would have alone been present with an inverse Hadamard transformation of order two had been ringed, in the sample matrix of order 1 × 6 and in the general matrix of order 6 × 2 of the second member.

In the case of a bidimensional transformation, a square sample matrix of order six is considered that is multiplied on the right by the coefficient matrix of equation (3) and on the left by the coefficient matrix transpose, which gives a square matrix of order two. One has :

$$\begin{bmatrix} 0 & 0 & \boxed{1\ \ 1} & 0 & 0 \\ -\alpha & -\alpha & \boxed{1\ -1} & \alpha & \alpha \end{bmatrix} \times \begin{bmatrix} x_{i,j} & \cdots & \cdots & x_{i,j+5} \\ \cdots & \boxed{x_{i+2,j+2}\ x_{i+2,j+3}} & \cdots \\ \cdots & \boxed{x_{i+3,j+2}\ x_{i+3,j+3}} & \cdots \\ x_{i+5,j} & \cdots & \cdots & x_{i+5,j+5} \end{bmatrix} \times \begin{bmatrix} 0 & -\alpha \\ 0 & -\alpha \\ 1 & 1 \\ 1 & -1 \\ 0 & \alpha \\ 0 & \alpha \end{bmatrix} \quad (9)$$

$$= \begin{bmatrix} U_{i+2,j+2} & U_{i+2,j+3} \\ U_{i+3,j+2} & U_{i+3,j+3} \end{bmatrix}$$

This gives for the coefficient $v$ obtained by double matrix multiplication :

$$U_{i+2,j+2} = x_{i+2,j+2} + x_{i+2,j+3} + x_{i+3,j+2} + x_{i+3,j+3} \quad (10)$$

$$U_{i+2,j+3} = -\alpha x_{i+2,j} - \alpha x_{i+2,j+1} + x_{i+2,j+2} - x_{i+2,j+3} + \alpha x_{i+2,j+4} + \alpha x_{i+2,j+5} - \alpha x_{i+3,j} - \alpha x_{i+3,j+1} + x_{i+3,j+2} - x_{i+3,j+3} + \alpha x_{i+3,j+4} + \alpha x_{i+3,j+5} \quad (11)$$

$$U_{i+3,j+2} = -\alpha[x_{i,j+2} + x_{i,j+3} + x_{i+1,j+2} + x_{i+1,j+3}] + x_{i+2,j+2} + x_{i+2,j+3} - x_{i+3,j+2} - x_{i+3,j+3} + \alpha[x_{i+4,j+2} + x_{i+4,j+3} + x_{i+5,j+2} + x_{i+5,j+3}] \quad (12)$$

$$U_{i+3,j+3} = \alpha^2[x_{i,j} + x_{i,j+1} + x_{i+1,j} + x_{i+1,j+1} + x_{i+4,j+4} + x_{i+4,j+5} + x_{i+5,j+4} + x_{i+5,j+5}] - \alpha^2[x_{i+4,j} + x_{i+4,j+1} + x_{i+1,j+4} + x_{i+1,j+5} + x_{i+4,j} + x_{i+4,j+1} + x_{i+5,j} + x_{i+5,j+1}] + \alpha[x_{i,j+2} + x_{i,j+3} + x_{i+2,j+4} + x_{i+2,j+5} + x_{i+3,j} + x_{i+3,j+1} + x_{i+4,j+2} + x_{i+5,j+2}] - \alpha[x_{i,j+2} + x_{i+1,j+2} + x_{i+2,j} + x_{i+2,j+1} + x_{i+3,j+4} + x_{i+3,j+5} + x_{i+4,j+3} + x_{i+5,j+3}] + x_{i+2,j+2} - x_{i+2,j+3} - x_{i+3,j+2} + x_{i+3,j+3} \quad (13)$$

In equation (9), the parts of the matrices which corresponded to the Hadamard transformation have been ringed.

Referring for the moment to FIG. 1, four coefficients of the bidimensional transform $U_{i+2,j+2}$, $U_{i+2,j+3}$, $U_{i+3,j+2}$, $U_{i+3,j+3}$ are shown as well as the regions formed by the samples of the image which lead to the formation of the transform. It can be seen that $U_{i+2,j+2}$ is only a function of four samples of the image and is nothing than the mean value of these samples $x_{i+2,j+2}$, $x_{i+2,j+3}$, $x_{i+3,j+2}$, $x_{i+3,j+3}$. The coefficient $U_{i+2,j+3}$ and the coefficient $U_{i+3,j+2}$ are a function of 12 samples and the coefficient $U_{i+3,j+3}$ is a function of 36 samples. It can also be seen that certain samples have a complete contribution, positive or negative, and other samples have a lesser contribution in $\alpha$ or in $\alpha^2$, positive or negative.

The matrix equation of the inverse transformation in the bidimensional case is the following. A square sample matrix of order six is considered that is multiplied on the right by the coefficient matrix of equation (6) and on the left by the coefficient matrix transpose which gives a square matrix of order two.

$$\begin{bmatrix} x_{i+2,j+2} & x_{i+2,j+3} \\ x_{i+3,j+2} & x_{i+3,j+3} \end{bmatrix} = \frac{1}{4} \begin{bmatrix} \alpha & 0 & \boxed{1\ \ 1} & -\alpha & 0 \\ \alpha & 0 & \boxed{1\ -1} & \alpha & 0 \end{bmatrix} \begin{bmatrix} u_{i,j} & \cdots & \cdots & u_{i,j+5} \\ \cdots & \boxed{u_{i+2,j+2}\ u_{i+2,j+3}} & \cdots \\ \cdots & \boxed{u_{i+3,j+2}\ u_{i+3,j+3}} & \cdots \\ u_{i+5,j} & \cdots & \cdots & u_{i+5,j+5} \end{bmatrix} \quad (14)$$

$$\times \begin{bmatrix} \alpha & -\alpha \\ 0 & 0 \\ 1 & 1 \\ 1 & -1 \\ -\alpha & \alpha \\ 0 & 0 \end{bmatrix}$$

The parts of the matrices which correspond to the inverse Hadamard transformation have been ringed in equation (14).

It has been supposed up to now that the multiplication matrix was of order 6× 2, its central parts being a Hadamard matrix of order two.

To extend the algorithm of the transformation of order two to order four, it is noticed that the iterative application of the matrix transformation resulting from equation (3) allows the following coefficients of the transform to be obtained : $u_{i,j-4}\, u_{i,j-3}\, u_{i,j-2}\, u_{i,j-1}\, u_{i,j}\, u_{i,j+1}\, u_{i,j+2}\, u_{i,j+3}\, u_{i,j+4}\, u_{i,j+5}\, u_{i,j+6}\, u_{i,j+7}$. The samples $u_{i,j+1}$ and $u_{i,j+3}$ thus calculated are retained and a matrix of order 1× 6 having coefficients with an index $j+p$ where $p$ is even is now multiplied by the coefficient matrix of order 6× 2 of equation (3), which gives :

$$[u_{i,j-4}\, u_{i,j-2}\, u_{i,j}\, u_{i,j+2}\, u_{i,j+4}\, u_{i,j+6}] \cdot \begin{bmatrix} 0 & -\alpha \\ 0 & -\alpha \\ 1 & 1 \\ 1 & -1 \\ 0 & \alpha \\ 0 & \alpha \end{bmatrix} = [v_{i,j}\, v_{i,j+1}] \quad (15)$$

The four coefficients of the transform are thus :

$$v_{i,j};\ v_{i,j+1};\ v_{i,j+2} = u_{i,j+1};\ v_{i,j+3} = u_{i,j+3}$$

It can be seen that the coefficients of the unidirectional transform are obtained from twelve image samples. This can be put in the form of the following matrix equation :

$$[x_{i,j-4}\, x_{i,j-3}\, \ldots\, x_{i,j+7}] \begin{bmatrix} 0 & -\alpha & 0 & 0 \\ 0 & -\alpha & 0 & 0 \\ 0 & -\alpha & -\alpha & 0 \\ 0 & -\alpha & -\alpha & 0 \\ 1 & 1 & -1 & -\alpha \\ 1 & 1 & 1 & -\alpha \\ 1 & -1 & \alpha & 1 \\ 1 & -1 & \alpha & -1 \\ 0 & \alpha & 0 & \alpha \\ 0 & \alpha & 0 & \alpha \\ 0 & \alpha & 0 & 0 \\ 0 & \alpha & 0 & 0 \end{bmatrix} = [v_{i,j}\, v_{i,j+1}\, v_{i,j+2}\, v_{i,j+3}] \quad (16)$$

The coding and decoding system of the invention gives a better quality of compression, since for a 2× 1 transformation, the probability of the coefficient $u_{i,j+1}$ being zero or small is greater than is the case for a Hadamard transformation. The transformation according to the invention introduces an attenuation of the false square contours and a better statistic approximation of the signal. In effect, during the calculation of the inverse transformation, a filtering operation is carried out on the coefficient $u_{i,j}$.

BRIEF DESCRIPTION OF THE DRAWINGS

Other advantages will appear from a reading of the description which follows and the attached drawings which illustrated it and in which :

FIG. 1, which has been mentioned in the introduction shows the respective contributions of the samples of the image to the samples of the transform ;

FIGS. 6a and 6b are a diagram showing the development of the points of the transform from the points of the image in the case of the system of FIG. 4.

DETAILED DESCRIPTION

Figure 2A:
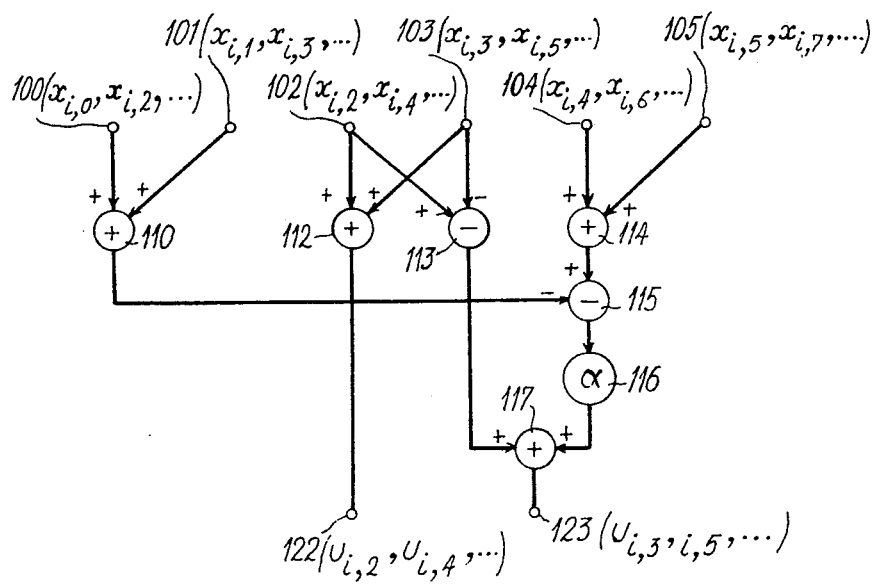
FIGS. 2a, 2b and 3a, 3b show respectively in the form of diagrams, the quickest method of forming samples of the transform from image samples and the method of formation of the samples of the reconstructed image from the samples of the transform.

Referring to FIG. 2a, the manner of forming the samples u of the image transform from the sample $x$ of the original image has been shown in the case of the equations (4) and (5). The samples $x_{i,0}$ to $x_{i,5}$ are applied to the terminals 100 to 105 during a first period, then the samples $x_{i,2}$ to $x_{1,7}$ are applied in a second period and so on by shifting the applied samples by two samples.

The terminals 100 and 101 are connected to the adder circuit 110. The terminals 102 and 103 are connected to the adder circuit 112 and to the subtractor circuit 113. The output of the adder are connected to the adder circuit 114. The output of the adder circuit 112 is connected to the output terminal 122 where the coefficients $u_{i,2}, u_{i,4} \ldots$ are found successively. The outputs of the adder circuits 110 and 114 are connected to the subtractor circuit 115 which provide a signal $(-u_{i,0} + u_{i,4})$, $(-u_{i,2} + u_{i,6}) \ldots$ The output of the subtractor circuit 115 is connected to a multiplier by $\alpha$ circuit 116. The output of the multiplier 116 and the output of the subtractor circuit 113 are connected to the adder circuit 117. Finally, the output of this latter adder circuit is connected to the output terminal 123. It is clear that, when $x_{i,0}$ to $x_{i,5}$ are applied to the terminals 100 to 105, the coefficient $u_{i,2}$ appears at the terminal 122 and the coefficient $u_{i,3}$ appears at the terminal 123.

Figure 2B:
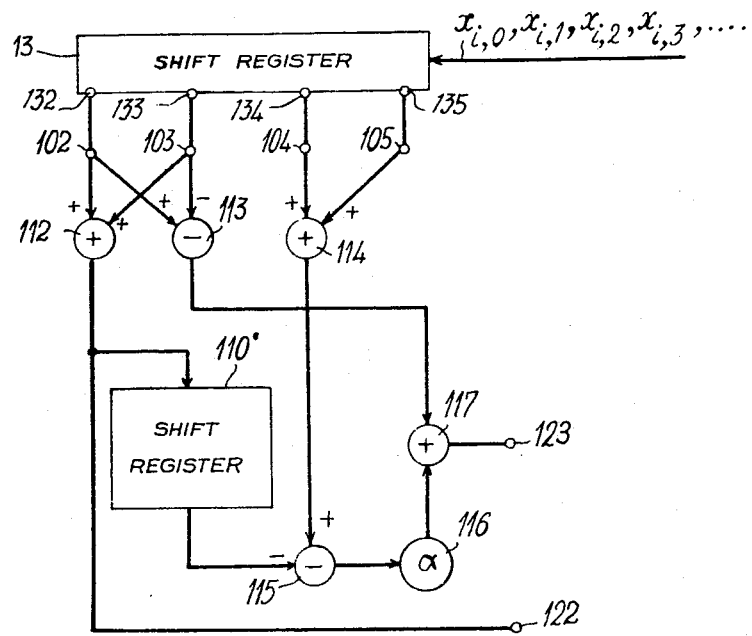

It can be seen (FIG. 2b) that it is possible to omit the adder circuit 110 and replace it by a memory in the form of a shift register 110', which stores $u_{i,2p}$ and reapplies it to the calculator during the calculation of $u_{i,2p+2}$. In FIG. 2b, 13 is a shift register having four outputs (in fact there are as many shift registers in parallel as bits in the samples) receiving the samples in series and advancing two steps at a time. The outputs 132–135 are respectively connected to the inputs 102–105 of the calculator. When $u_{i,2p}$ appears at the output terminal 122, it is also applied to the input of the shift register 110' which reapplies it to the subtractor circuit 115, a cycle later.

Figure 3A:
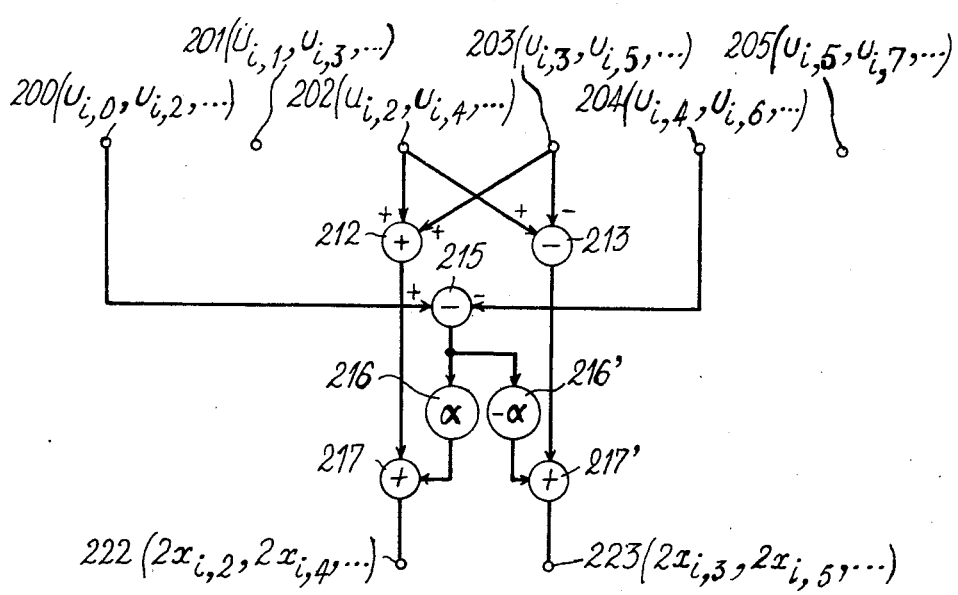

Referring to FIG. 3a, the manner of forming the samples $x$ of the reconstituted image from the coefficients u of the image transform in the case of equations (7) and (8) is shown. The coefficients $u_{i,0}$ to $u_{i,5}$ are applied to the terminals 200 to 205 during a first period, then the coefficients $u_{i,2}$ to $u_{i,7}$ are applied during a second period and so on by shifting the applied coefficients by two coefficients.

The terminals 202 and 203 are connected to the adder circuit 212 and the subtractor circuit 213. The terminals 200 and 204 are connected to the subtractor circuit 215. The output of this circuit 215 is connected to two multiplier circuits 216 and 216' having multiplication factors of $\alpha$ and $-\alpha$. Finally, the outputs, of the multiplier circuits 216 and 216' are connected to two adder circuits 217 and 217', connected, in addition, respectively to adder circuits 212 and subtractor circuit 213. The outputs of the adder circuits 217 and 217' are connected respectively to the output terminals 222 and 223.

It is clear that when $u_{i,0}$ to $u_{i,5}$ are applied to the terminals 200 to 205, the sample $x_{i,2}$ appears at the terminals 222 and the sample $x_{i,3}$ at the terminal 223.

Figure 3B:
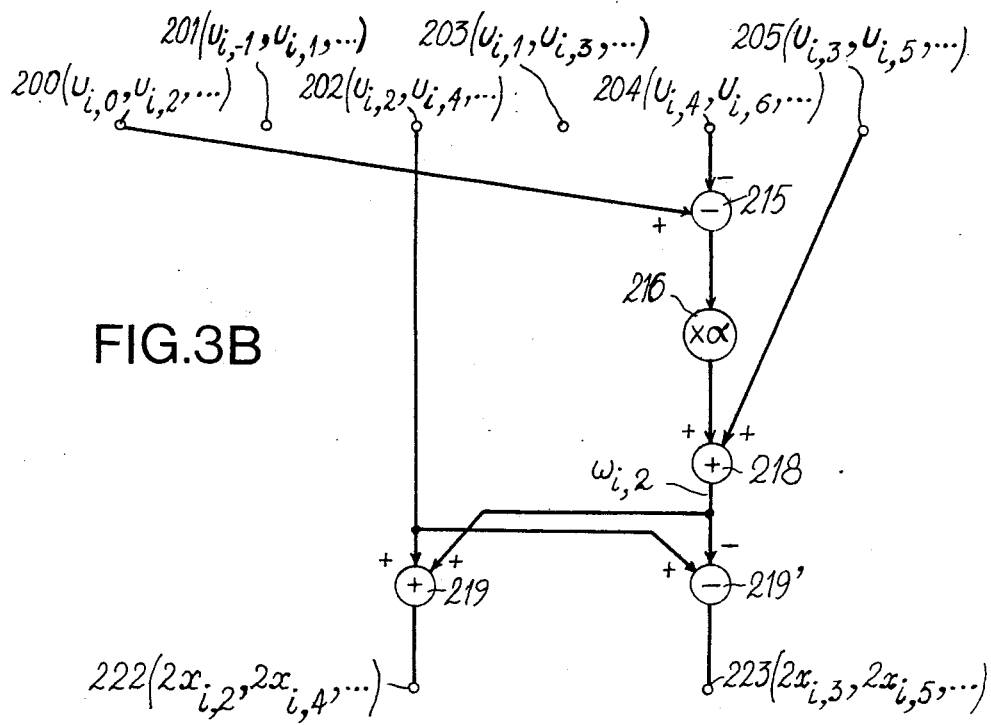

FIG. 3b shows a second calculator of $x$ as a function of $u$ based on the application of equations (7') and (8'). Instead of being applied to the terminals 200 to 205 in the order $u_{i,0}$ to $u_{i,5}$, the samples of the image transform are applied to these terminals in the order $u_{i,0}, u_{i,-}, u_{i,2}, u_{i,1}, u_{i,4}, u_{i,3}$... which is the natural order of generation of these coefficients. The terminals 200 and 204 are, as in FIG. 3a, connected to the subtractor circuit 215 whose output is connected to the multiplier by $\alpha$ circuit 216. The output of the circuit 216 is connected to an adder circuit 218 for which the second input is connected to the terminal 205. It is clear that the signal $w_{i,2}$ is to be found at the output of the circuit 217. The signal is applied to the adder circuit 219 and to the subtractor circuit 219' for which the second inputs are connected to the terminal 202. The output of the adder circuit 219 is connected to the output terminal 222 and the output of the subtractor circuit 219' is connected to the output terminal 223.

Figure 4:
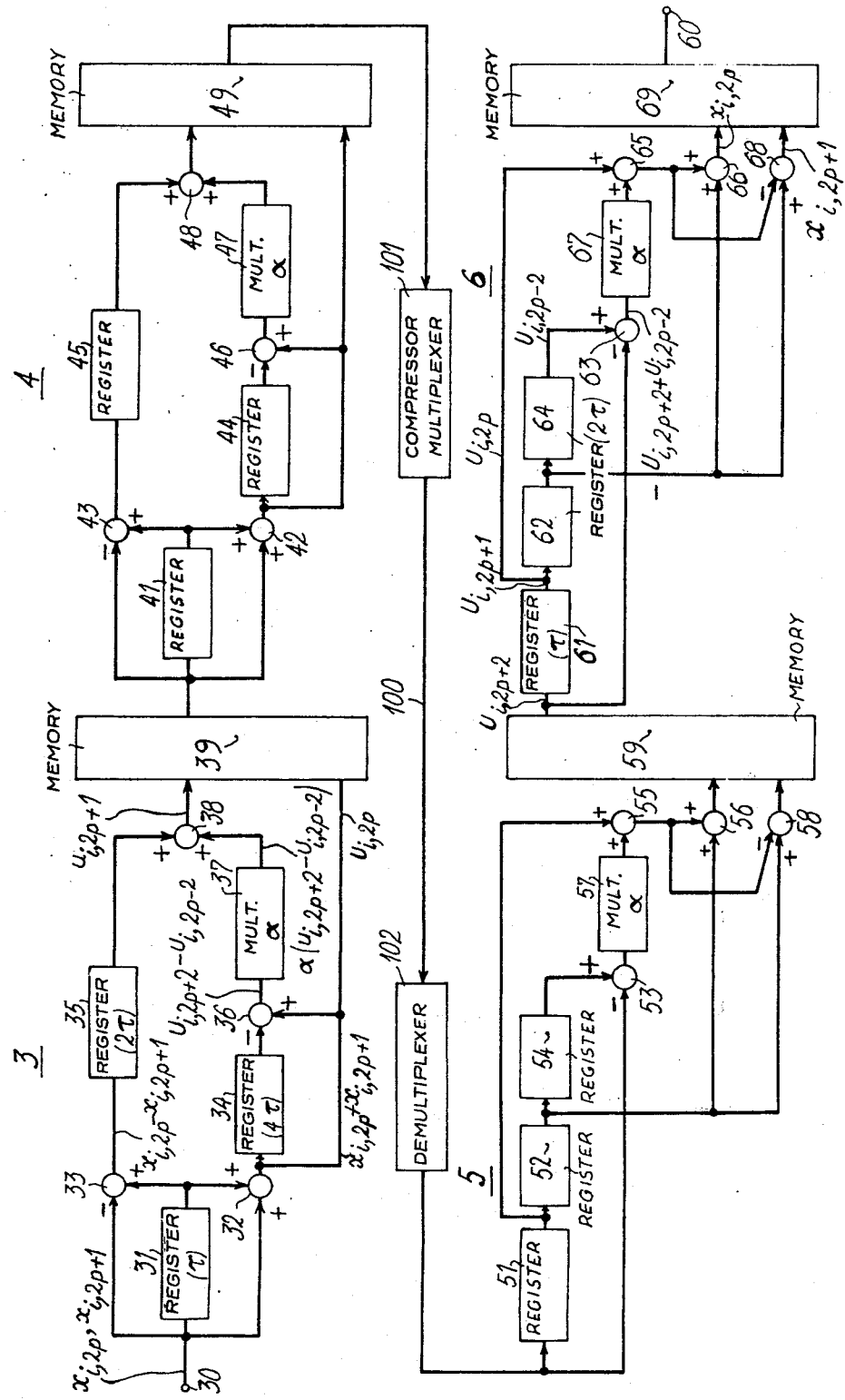
FIG. 4 shows in the form of a block diagram, the coding and decoding system of images of the invention for a 2×2 dimension.

FIG. 4 shows the coder and decoder of images by matrix transform in accordance with the invention for partial images of 2× 2 points.

The samples $x_{i,2p}, x_{i,2p+1}$ ... of the partial image are applied to the input terminal 30 of a register 31 which delays the samples by the duration $\tau$ between two successive samples. The input terminal 30 and the output of the register 31 are connected to an adder circuit 32 and to a subtractor circuit 33 which carry out the sum and difference of the two successive samples $(x_{i,2p} \pm x_{i,2p+1})$. The outputs of the adder circuit 32 and subtractor circuit 33 are connected respectively to registers 34 and 35 having delays of 2 $\tau$ and 4 $\tau$. At the moment when the register 34 receives, at its input, the signal $u_{i,2p+2}$, it provides at its output the signal $u_{i,2p-2}$. These two signals are applied to the subtractor circuit 36 which provides $(u_{1,2p+2} - u_{i,2p-2})$. This latter difference signal is applied to a multiplier circuit 37 which multiplies it by $\alpha$.

The signal $(x_{i,2p} - x_{i,2p+1})$ leaving the register 35 has been delayed by $2\tau$ to make it concomitant with the signal $\alpha(u_{i,2p+2} - u_{i,2p-2})$ which leaves the register 34. These two signals are added in the adder register 38 to form $u_{i,2p-1}$. The signals representing the coefficients $u_{i,2p}$ and $u_{i,2p+1}$ are stored in the memory 39 so that the coefficients corresponding to a line of the image form a line in the memory 39. Then the coefficients are rearranged in the memory 39 as will be explained.

The second stage 41 to 49 is identical to the first stage 31 to 39, with the difference that the circuit 45 has a delay of 2 lines and the circuit 44 a delay of 4 lines. Instead of providing the coefficients $u$, it provides the coefficients U. The circuits at the two stages to which the reference numerals terminate by the same unit digit are identical, except for what has just been said regarding the delay.

As many coefficients U as there are points in the image are found in the memory 49. These coefficients U are grouped in squares in memory 49. If a suitable direction of subtraction is given to subtractor circuits 33, 36, 43, 46, in each square the coefficient $U_{i,j}$ at the top left is of the type of FIG. 1(A), i.e. that which results from the contribution of the four image points (equation (10)), the coefficient $U_{i,j+1}$ at the top right is of the type of FIG. 1 (B) (equation(11)), i.e. that which results from a contribution of 12 image points, the coefficient $U_{i+1,j}$ at bottom left is of the type of FIG. 1(C) (equation (12)), i.e. that which results from a contribution of 12 image points, and the coefficient $U_{i+1,j+1}$ at bottom right is of the type of FIG. 1(D) (equation (13)), which results from a contribution of 36 image points.

The signals U are applied to the compressor-multiplexer 101; then they are transmitted through the transmission channel 100 to the demultiplexer 102. The compressor contained in the compressor-multiplexer 101 compresses differently the signals of types of FIGS. 1(A), (B), (C) and (D). It can, for example, transmit with a certain number of bits the signals of the type of FIG. 1(A), with a certain lesser number of bits the signals of the type of FIGS. 1(B) and 1(C), and with an even lesser number of bits the signals of the type of FIG. 1(D). These latter signals need not be transmitted at all. The compressor can use the compression processes known in the case of the conventional Hadamard transformation.

The coefficient $\alpha$ is determined experimentally. The applicant has found that the best results are obtained by taking $\alpha$ between 0.1 and 0.2. The value 0.125 seems particularly interesting as much for its results as for its simplicity of digital coding.

The decoder comprises, like the coder, two identical delay stages of register, one relative to a decoding by lines and the other a decoding by columns. The second stage will be described.

The memory 59 of the first stage has been filled by lines and the coefficients have been arranged as will be explained. The signal $u_{i,2p+2}$ is applied to the shift register 61 where it is delayed by $\tau$ as well as to a subtractor circuit 63. The signal $u_{i,2p+1}$ leaving the register 61 is applied to a register 62 for delaying it by $\tau$ and to an adder circuit 65. the signal $u_{i,2p}$ leaving the register 62 is applied to an adder circuit 66, to a subtractor circuit 68 and to a shift register having a delay $2\tau$. The signal $u_{i,2p-2}$ leaving the register 64 is applied to the subtractor circuit 63 whose output is connected to a multiplier by a $\alpha$ circuit 67. The output of the multiplier circuit 67 is connected to the adder circuit 65 and the output of the latter is connected to adder circuit 66 and subtractor circuit 68. Finally, these two last mentioned circuits are connected to the memory 69 from which the output 60 is the output of the decoder.

In FIG. 6A(A), an image having a dozen points per line and a dozen lines has been shown. A rectangle T surrounding six samples moves along the line from a position $T_{0,0}$ in which it contains two zero points on the left outside the image to a position $T_{0,5}$ in which it contains two zero points on the right outside the image. Each position of the rectangle T on a line of the image gives rise to two coefficients of a line of the transform of FIG. 6A(B). These coefficients are of two different types. One shown in white is of the type $u_{i,2p}$ and the other shown in cross hatching is of the type $u_{2p+1}$. These are samples which are written into the memory 39.

Before subjecting the line transform to the column transformation, the coefficient $u_{2r,2p+1}$ is exchanged in the matrix of FIG. 6A(B) with the coefficient $u_{23+,2p}$ so as to obtain the matrix of FIG. 6A(C). In other words, it can be said that the matrix of order 12 × 12 of FIG. A(B) is split into matrices of order 2 × 2 and that these latter matrices are transposed. This re-arrangement of the matrix 6A(B), in order to obtain the matrix 6A(C), allows a stage identical to the coding stage for the lines to be taken as the coding stage for the columns. Returning to the case of a 6 × 6 sample matrix of equation (9) the coding stage for the lines serves to multiply each sample line forming a line matrix of order 1 × 6 by a general multiplication matrix of order 6 × 2 thus to obtain a matrix of order 1 × 2 for each sample line. All these line matrices form a resulting matrix of order 6 × 2. But, when this 6 × 2. But, when this 6 × 2 matrix has been obtained, i.e. when the middle matrix and the right hand matrix of equation (9) has been multiplied therebetween, there remains the following multiplication of the resulting matrix by left hand matrix of equation (9):

$$\overbrace{\begin{bmatrix} 0 & 0 & 1 & 1 & 0 & 0 \\ -\alpha & -\alpha & 1 & -1 & \alpha & \alpha \end{bmatrix}}^{\text{I}} \times \overbrace{\begin{bmatrix} u_{i,2p} & u_{i,2p+1} \\ u_{i+1,2p} & u_{i+1,2p+1} \\ u_{i+2,2p} & u_{i+2,2p+1} \\ u_{i+3,2p} & u_{i+3,2p+1} \\ u_{i+4,2p} & u_{i+4,2p+1} \\ u_{i+5,2p} & u_{i+5,2p+1} \end{bmatrix}}^{\text{II}} \quad (17)$$

This multiplication is a multiplication of a matrix of order 2 × 6 by a matrix of order 6 × 2 which gives a resulting matrix of order 2 × 2. It is advantageous to convert the "u" coefficient matrix of order 6 × 2 (matrix (II) in expression 17) into a 2 × 6 matrix and to convert the general multiplication matrix of order 2 × 6 (matrix (I) in expression 17) into a 6 × 2 matrix which allows the same calculation algorithm as in the line transformation to be used for the column transformation.

Considering that the transpose of a matrix product is equal to the product of the transposes taken in the reverse order, the product (17) can be written as follows by replacing matrix (I) by matrix (I') and matrix (II) by matrix (II') and changing the multiplication direction:

$$\begin{bmatrix} \begin{bmatrix} u_{i,2p} & u_{i+1,2p} \\ u_{i,2p+1} & u_{i+1,2p+1} \end{bmatrix} & \begin{bmatrix} u_{i+2,2p} & u_{i+3,2p} \\ u_{i+2,2p+1} & u_{i+3,2p+1} \end{bmatrix} & \begin{bmatrix} u_{i+4,2p} & u_{i+5,2p} \\ u_{i+4,2p+1} & u_{i+5,2p+1} \end{bmatrix} \end{bmatrix} \begin{bmatrix} 0 & -\alpha \\ 0 & -\alpha \\ 1 & 1 \\ 1 & -1 \\ 0 + & \alpha \\ 0 + & \alpha \end{bmatrix} \quad (18)$$

If each of the component matrices of order 2 × 2 constituting the matrix for the "u coefficients" of the expressions 17 and 18 is considered, it can be seen that they are obtained relative to each other by transposition.

The transformation applied to the matrix of FIG. 6A(A) is again applied to the matrix of FIG. 6B(C), i.e. a rectangle R surrounding six samples is displaced along the line from a position $R_{0,0}$ surrounding two zero samples of the proceeding line, the samples $u_{0,0}$ and $u_{1,0}$ and the samples $u_{2,0}$ and $u_{3,0}$ to the position $R_{5,0}$. In fact, the calculation device is fed by the reading line by line of the matrix (C), the data of the upper and lower lines being retained in the internal memories of the device (44 and 45 of FIG. 4).

When the rectangle R is displaced along an even line (white squares) of (C), the coefficients of type $U_{i,2p}$, $U_{i+1,2p}$ are obtained; by moving along an odd line (cross hatched) the coefficients $U_{i,2p+1}$, $U_{i+1,2p+1}$ are obtained.

The matrix (D) is filled line by line with coefficients of different types, the first shown □ is of the type $U_{2r,2p}$, the second shown ▨ is of the type $U_{2r+1,2p}$, the third shown ■ is of the type $U_{2r,2p+1}$ and the fourth shown ■ is of the type $U_{2r+1,2p+1}$. It should be noticed that in order to recover the normal matrix configuration, the elementary matrices 2 × 2 for the U coefficients must be transposed.

Figure 5A:
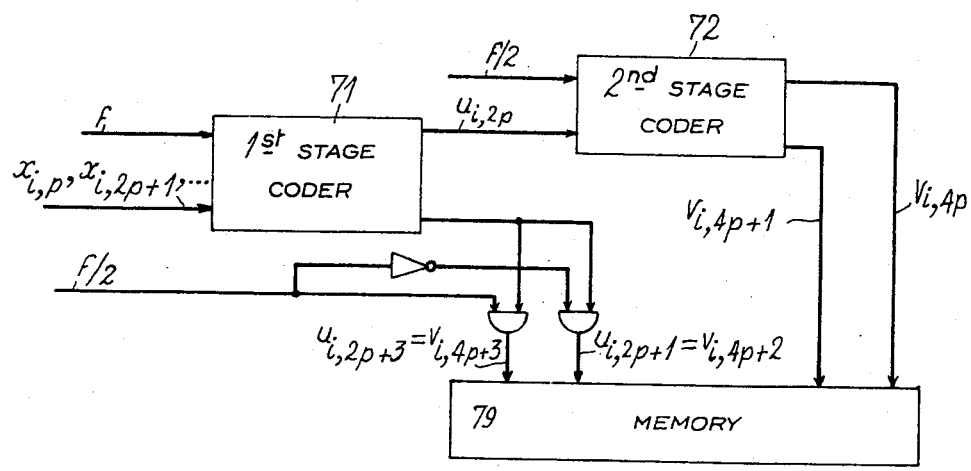
FIGS. 5a and 5b show, also in the form of a block diagram, a system for coding and decoding images for 4× 4 dimensions.

FIG. 5 shows a line coder for the 4 × 4 dimension composed of two stages 71 and 72 of the type of the first stage 4 of FIG. 4. The first stage 71 operates at the rate $f$, receives the samples of the image and provides the coefficients $u_{i,2p}$ and $u_{1,2p+1}$. The coefficients $u_{i,2p+1}$ are outputted and the coefficients $u_{i,2p}$ are applied to the second stage 72 identical to the first with the sole difference that it operates at the frequency $f/2$.

The second stage 72 provides $v_{i,4p}$ and $v_{i,4p+1}$. The first stage provides one time in two $u_{i,2p+1} = v_{i,4p+2}$ and the other time $u_{i,2p+1} = v_{i,4p+3}$. The coefficients $v_{i,4p}$, $v_{i,4p+1}$, $v_{i,4p+2}$ and $v_{4p+3}$ are written in the memory 79. In order to carry out the complete transform, a column coder having two stages is arranged behind the line coder 71-72.

Figure 5B:
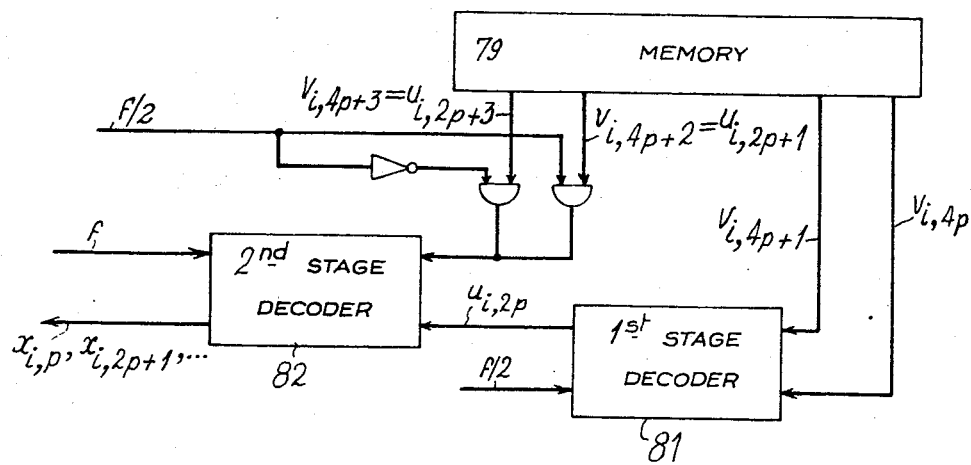

FIG. 5b shows a line decoder for the 4 × 4 dimension composed of two stages 81 and 82 of the type of the second stage 6 of FIG. 4. The first stage 81 operates at the rate $f/2$, receives from the memory 79 the coefficients of the transform $v_{i,4p}$ and $v_{i,4p+3}$ and provides the coefficients $u_{i,2p}$ to the second stage 82.

The second stage 82 operates at the rate f. The coefficients $v_{i,4p+2}$ and $v_{i,4p+3}$ are applied, each one time in two, to the stage 82. At the output of this stage, the samples of the reconstructed image $x_{i,2p}$, $x_{i,2p+1}$, ... are found. In order to carry out the complete transform, a column decoder having two stages is arranged in front of the line decoder 81-82. The putting in cascade of $a$ line stages and $b$ column stages allow us the transformation to be carried out on a sub-image having $2^a 2^b$ points.

What we claim is:

1. A matrix transform system for coding images with weighted contribution of several points of the image to each points of the coded image and for decoding coded images with weighted contribution of several points of the coded image to each point of the decoded image, said system comprising:
   a. means for sampling the lines of an image to be coded and forming with said image samples a square matrix associated with the image;
   b. means for splitting said square matrix associated with the image into a plurality of first input component matrices of order 3N × 3N having a central part of order N × N;
   c. means for multiplying each of said first input component matrices by a first rectangular coefficient matrix of order N × 3N having a square central part in which the coefficients are equal to positive or negative unity and two square lateral parts in which the coefficients are selectively equal to zero and ± α where α is a predetermined factor smaller than unity, and forming first intermediate matrices of order N × 3
   d. means for multiplying each of said first intermediate matrices by a second rectangular coefficient matrix of order 3N × N which is the transpose of said first rectangular coefficient matrix, and forming first output matrices of order N × N, each of said first output matrices being the transform of the central part of a first input component matrix;

e. means for forming with said first output matrices a square matrix associated with the coded image;

f. means for splitting said square matrix associated with the coded image into a plurality of second input component matrices of order 3N × 3N having a central part of order N × N;

g. means for multiplying each of said second input component matrices by a third rectangular coefficient matrix of order N × 3N having a square central part in which the coefficients are equal to positive or negative unity and two square lateral parts in which the coefficients are selectively equal to zero and (a) ± $\alpha$ where $\alpha$ is said predetermined factor smaller than unity and forming second intermediate matrices of order N × 3N;

h. means for multiplying each of said second intermediate matrices by a fourth rectangular coefficient matrix of order 3N × N which is the transpose of said third rectangular coefficient matrix and forming second output matrices of order N × N, each of said second output matrices being the transform of the central part of a second input component matrix; and i. means for forming with said second output matrices a square matrix associated with the decoded image.

2. A matrix transform system for coding and decoding images according to claim 1 in which N is a power of two and the central part of the first, second, third and fourth rectangular coefficient matrices is a Hadamard matrix.

3. A matrix transform system for coding and decoding images according to claim 1 in which N is a power of two and the central part of the first, second, third and fourth rectangular coefficient matrices is a Haar matrix.

4. A matrix transform system for coding images according to claim 1, in which N = 2, said means for multiplying each of the first input component matrices by a first rectangular coefficient matrix of order 2 × 6 having a square central part in which the coefficients are equal to positive or negative unity and two square lateral parts in which the coefficients are selectively equal to zero and ±$\alpha$ where $\alpha$ is a predetermined factor smaller than unity comprises;

a. means for splitting the samples of each line of a first input component matrix into a central group of two samples and two lateral groups of two samples;

b. a first adder and subtractor circuit for forming the sum and the difference of the samples of the central sample group;

c. a second adder and subtractor circuit for forming the sums of the samples of the lateral sample groups and forming the difference of said sample sums;

d. a first multiplier and adder circuit for multiplying said difference of said sample sums by $\alpha$ to obtain a first multiplication result and for forming the sum of said first multiplication result and of said difference of the samples of the central sample group;

the signals provided by said first adder circuit and by said first multiplier and adder circuit forming the coefficients of first intermediate matrices and said means for multiplying each of the first intermediate matrices by a second rectangular coefficient matrix of order 6 × 2 having a square central part in which the coefficients are equal to positive or negative unity and two square lateral parts in which the coefficients are selectively equal to zero and ±$\alpha$ comprises:

e. means for splitting the coefficients or each line of a first intermediate matrix into a central group of two coefficients and two lateral groups of two coefficients;

f. a third adder and subtractor circuit for forming the sum and the difference of the intermediate coefficients of the central intermediate coefficient group;

g. a fourth adder and subtractor circuit for forming the sums of the coefficients of the lateral coefficient groups and forming the difference of said coefficient sums;

h. a second multiplier and adder circuit for multiplying said difference of said coefficient sums by $\alpha$ to obtain a second multiplication result and for forming the sum of said second multiplication result and of said difference of the intermediate coefficients of the central intermediate coefficient group; the signals provided by said third adder circuit and by said second multiplier and adder circuit forming the coded image samples.

5. A matrix transform system for decoding coded images according to claim 1, in which N = 2, the means for multiplying each of the second input component matrices by a third rectangular coefficient matrix or order 2 × 6 having a square central part in which the coefficients are equal to positive or negative unity and two square lateral parts in which the coefficients are selectively equal to zero and ±$\alpha$ where $\alpha$ is a predetermined factor smaller than unity comprises;

a. means for splitting the samples of each line of a second input component matrix into a central group of two samples and two lateral groups of two samples;

b. a first subtractor circuit for forming the difference of one sample of a lateral group and of one sample of the other lateral group;

c. a first multiplier and summing circuit for multiplying said difference of samples of lateral groups by $\alpha$ to obtain first multiplication result and for forming algebric summation of said first multiplication result and of both said samples of the central group;

the signals provided by said first multiplier and summing circuit forming the coefficients of a second intermediate matrix and said means for multiplying each of the second intermediate matrices by a fourth rectangular coefficient matrix of order 6 × 2 having a square central part in which the coefficients are equal to positive or negative unity and two square lateral parts in which the coefficients are selectively equal to zero and ±$\alpha$ comprises;

d. means for splitting the coefficients of each line of a second intermediate matrix into a central group of two coefficients and two lateral groups of two coefficients;

e. a second subtractor circuit for forming the difference of one coefficient of a lateral coefficient group and of one coefficient of the other lateral coefficient group;

f. a second multiplier and summing circuit for multiplying said difference of coefficients or lateral coefficient groups by $\alpha$ to obtain second multiplication result and for forming algebric summation of said second multiplication result and of both said coefficients of the central coefficient group;

the signals provided by said second multiplier and summing circuit forming the decoded image samples.

* * * * *